(No Model.) 5 Sheets—Sheet 1.

A. H. SHOCK.
CIGAR MAKING MACHINE.

No. 419,893. Patented Jan. 21, 1890.

Witnesses
J. A. Rutherford
Robert Everett

Inventor
Abraham H. Shock.
By Attorney James L. Norris (No Model.) 5 Sheets—Sheet 2.

A. H. SHOCK.
CIGAR MAKING MACHINE.

No. 419,893. Patented Jan. 21, 1890.

Witnesses
J. A. Rutherford
Robt Everett

Inventor
Abraham H. Shock.
By Attorney James L. Norris

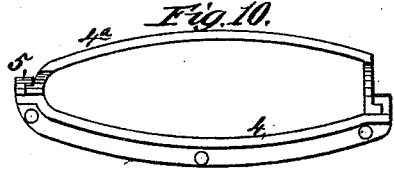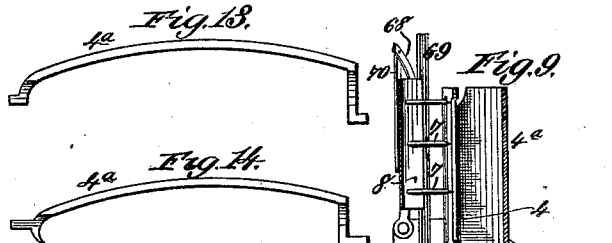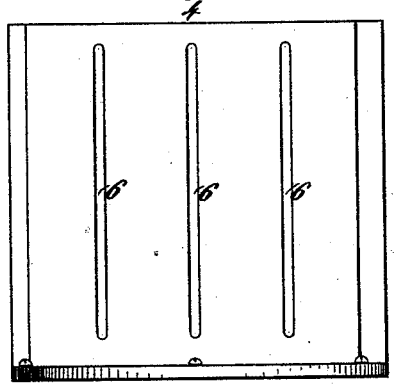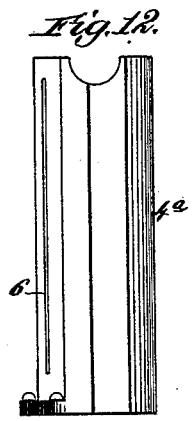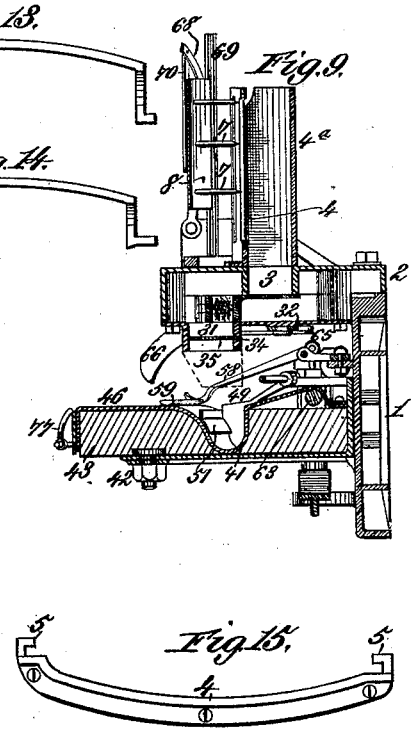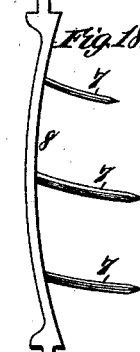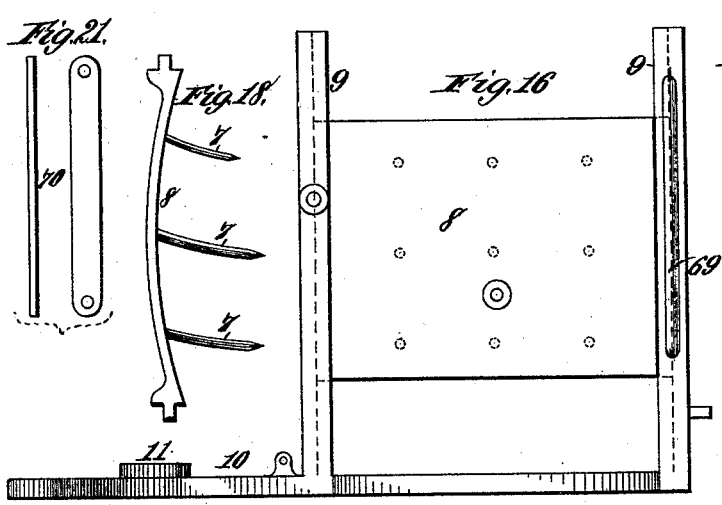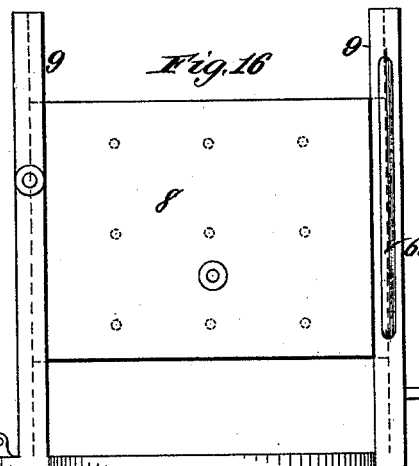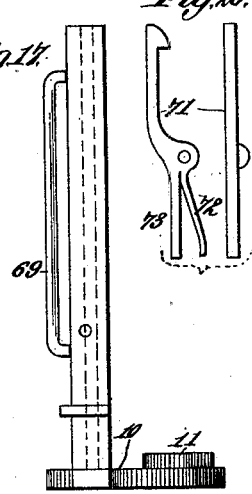

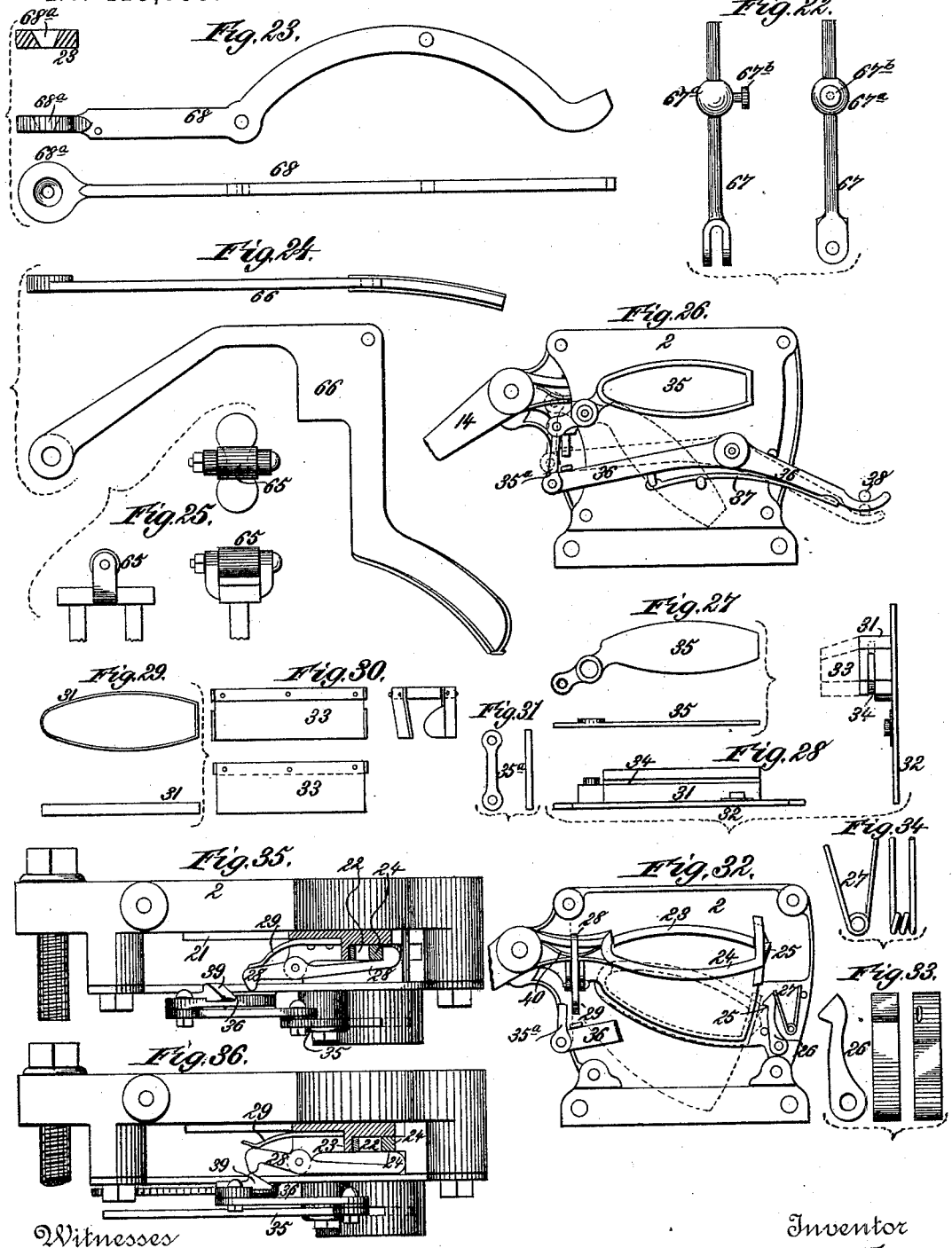

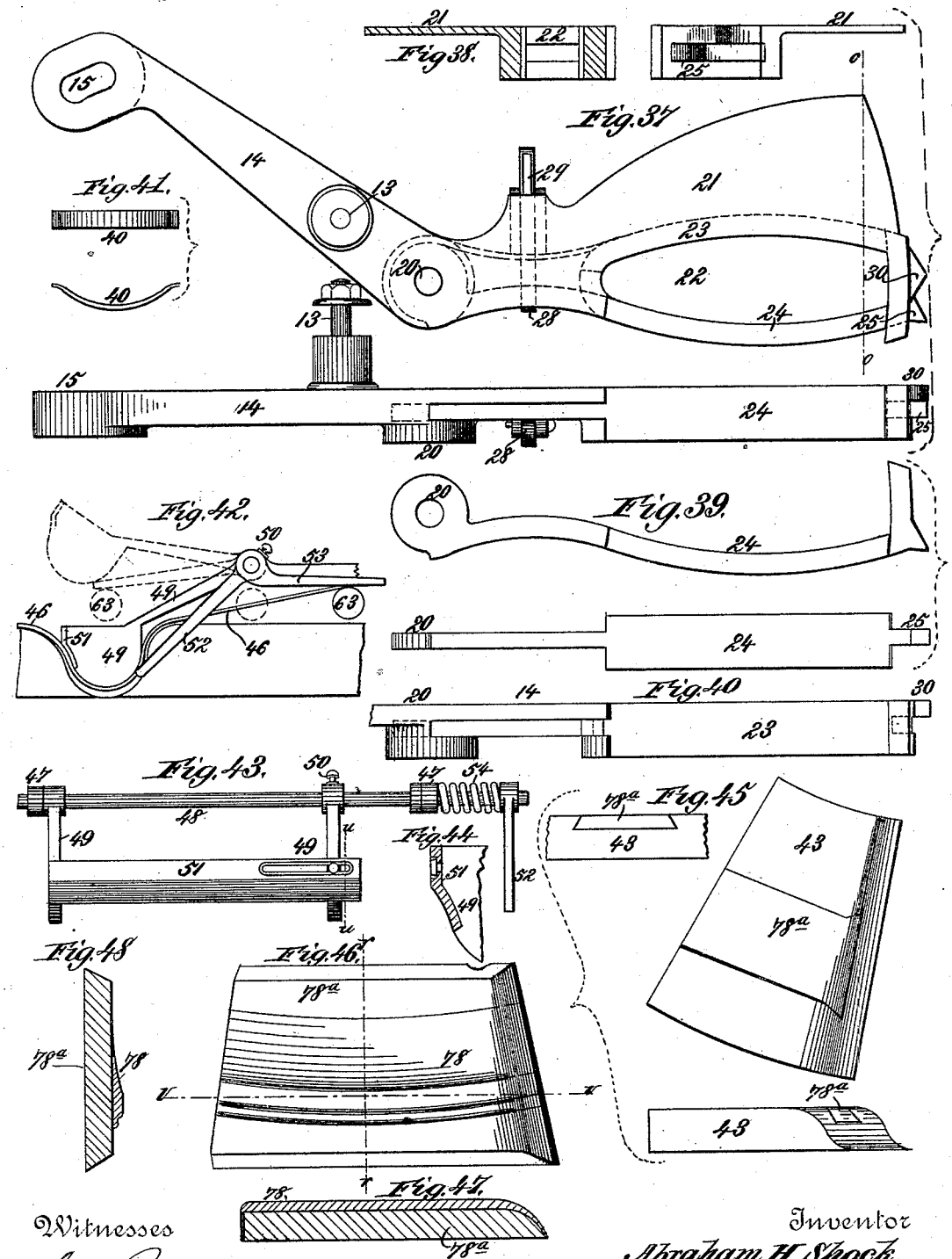

UNITED STATES PATENT OFFICE.

ABRAHAM H. SHOCK, OF LANCASTER, PENNSYLVANIA, ASSIGNOR OF ONE-HALF TO SAMUEL KAUFMAN, OF SAME PLACE.

CIGAR-MAKING MACHINE.

SPECIFICATION forming part of Letters Patent No. 419,893, dated January 21, 1890.

Application filed May 29, 1888. Renewed June 27, 1889. Serial No. 315,723. (No model.)

*To all whom it may concern:*

Be it known that I, ABRAHAM H. SHOCK, a citizen of the United States, residing at Lancaster, in the county of Lancaster and State of Pennsylvania, have invented new and useful Improvements in Cigar-Making Machines, of which the following is a specification.

My invention relates to cigar-making machines of the general character described in Letters Patent No. 388,314, granted to me August 21, 1888; and the invention consists in certain features of construction and novel combinations of parts hereinafter set forth, whereby the machine is particularly adapted for the bunching of long fillers, though it may also be used for preparing and wrapping bunches made from loose or scrap tobacco.

Figures 1, 4:
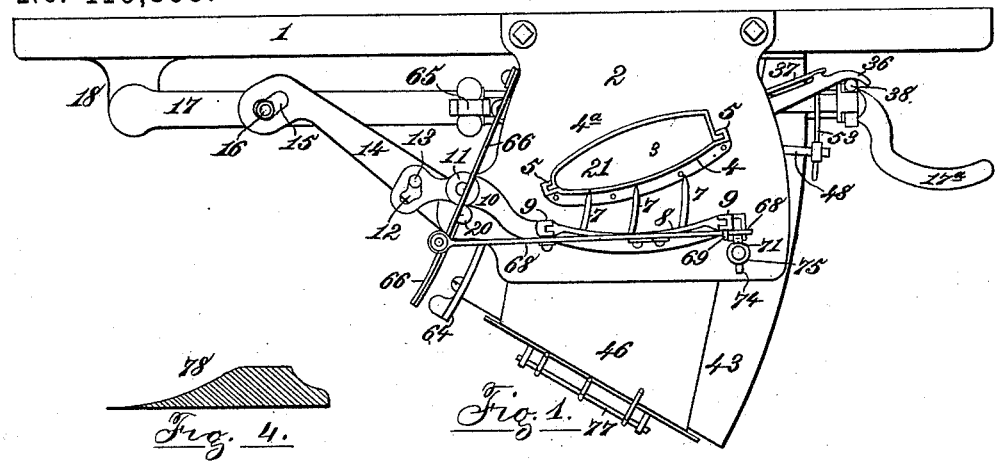
Figures 2, 5:
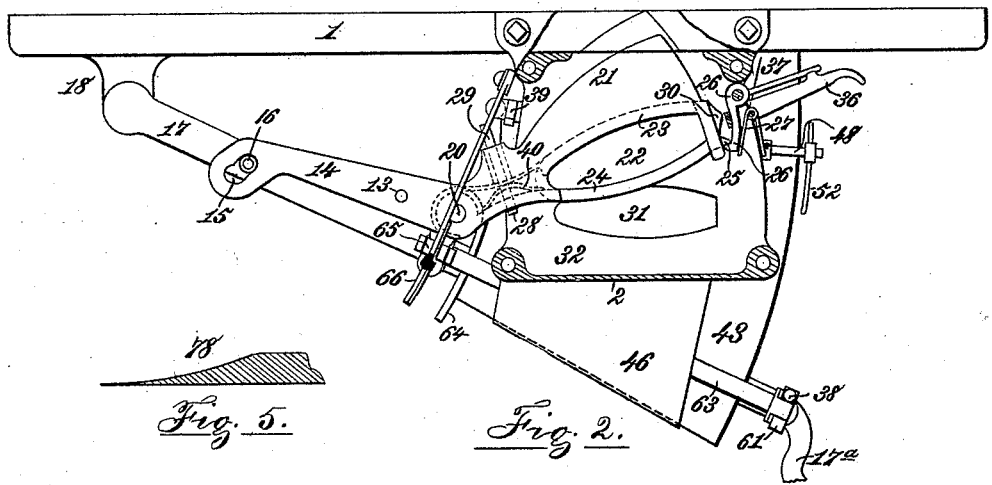
Figure 3:
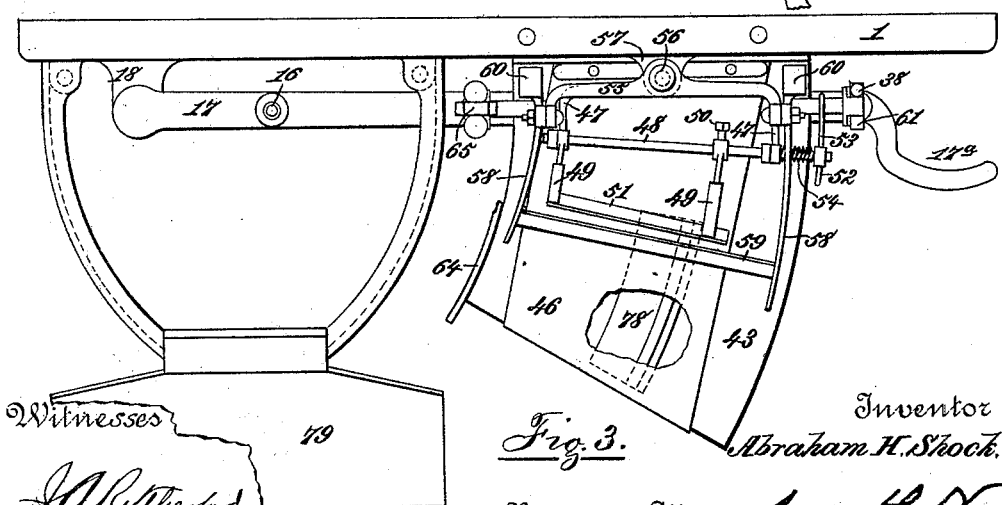
Figure 6:
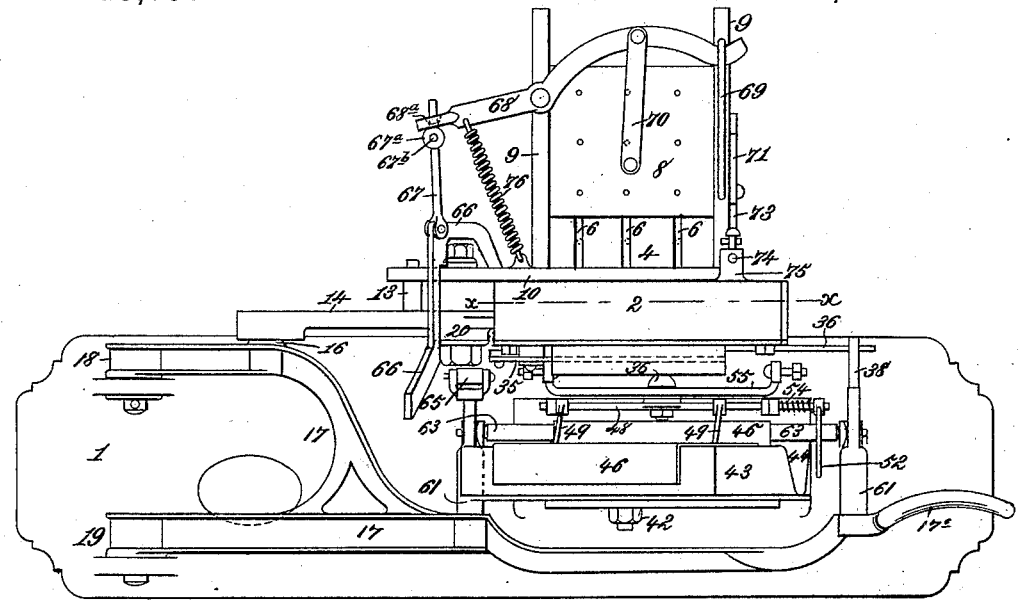
Figure 7:
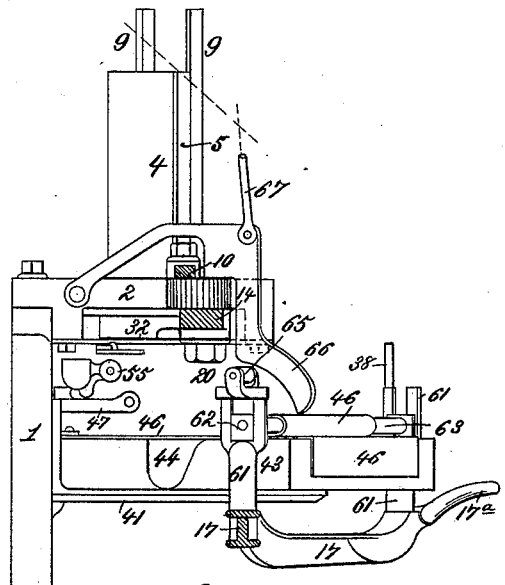
Figure 8:
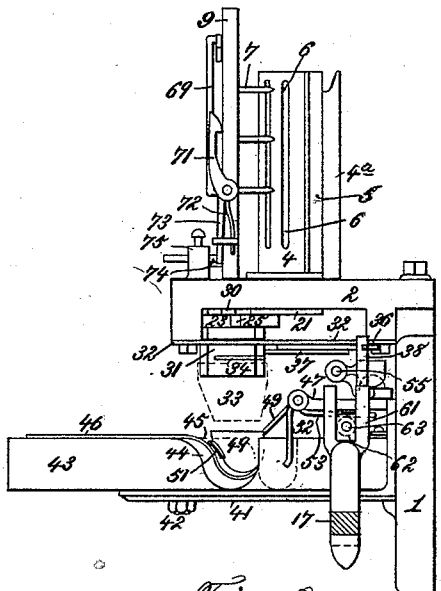

In the annexed drawings, illustrating the invention, Figure 1 is a plan of my improved cigar making or bunching machine. Fig. 2 is a similar view, partly in section, on the line *x x* of Fig. 6, showing the parts in the position they occupy when the main operating-lever is thrown forward and illustrating certain details of construction more clearly. Fig. 3 is a plan of the machine with the upper portion removed. Figs. 4 and 5 are sectional detail views of a butt-shaper, hereinafter explained. Fig. 6 is a front elevation of the machine. Fig. 7 is a partly-sectional end elevation viewed from the left-hand end of the machine. Fig. 8 is a similar view of the opposite end of the machine. Fig. 9 is a transverse vertical section of the machine through the center line of the rolling-board. Fig. 10 is a top view of the hopper. Fig. 11 is a front elevation of the hopper. Fig. 12 is an end elevation of the hopper. Fig. 13 is a top view of the removable back of the hopper. Fig. 14 is a top view of a smaller back of the hopper. Fig. 15 is a top view of the front of the hopper, showing flange. Fig. 16 is a front elevation of the vertically-sliding plate or feeding-rack and its horizontally-oscillating support. Fig. 17 is an end elevation of the feeding-rack viewed from the right. Fig. 18 is a top view of the feeding-rack. Fig. 19 is a top view of the oscillating arm that supports said rack. Fig. 20 shows front and back views of the feed-lever retaining-hook. Fig. 21 shows side and back views of feed-lever connecting-link. Fig. 22 shows front and side views of elevating-link, showing adjusting-ball and set-screw. Fig. 23 shows front and top views of feeding-lever with a section through its conical eye. Fig. 24 shows side and top views of the elevating-lever. Fig. 25 shows side, top, and front views of the elevating-roller. Fig. 26 is a view of the upper part of the machine inverted. Fig. 27 shows plan and side views of the lower valve. Fig. 28 shows front and end views of the receiving-chamber, showing valve-slot. Fig. 29 shows plan and side views of the lower part of the receiving chamber, to which the flexible tube is attached. Fig. 30 is a longitudinal vertical section and a front view and end view of the flexible tube attached to the lower end of the receiving-chamber. Fig. 31 shows plan and side views of the lower valve-connecting link. Fig. 32 is a view of the upper part of the machine inverted, with the bottom plate removed. Fig. 33 shows top, side, and back views of compressing-hook. Fig. 34 shows top and side views of the compressing-spring. Fig. 35 is a sectional detail view of left-hand side of the machine, with portion of the compressing-lever removed, showing the compressing-chamber and retaining-hook in the position immediately preceding the opening of the lower valve. Fig. 36 is a similar view with the lower valve open. Fig. 37 shows top, front, and end views of the compressing-chamber complete. Fig. 38 is a vertical cross-section of the compressing-chamber through the line *o o* of Fig. 37. Fig. 39 shows top and side views of the movable compressing-jaw. Fig. 40 is a side view of the compressing-chamber, with the movable compressing-jaw removed. Fig. 41 shows top and side views of the compressing-jaw-releasing spring. Fig. 42 is an end elevation of the pocket-former complete, showing it in two positions. Fig. 43 is a front view of pocket-former complete. Fig. 44 is a vertical cross-section of clamping-bar through line *w w* of Fig. 43. Fig. 45 shows top, end, and partial front views of the rolling-board, showing, also, the dovetailed block to which the rubber shapers are attached. Fig. 46 is a top view of the dovetailed shaper-block enlarged, with rubber shaper in place. Fig. 47 is a longitudinal vertical section of the shaper-block and shaper through the line *v v* of Fig. 46, and Fig. 48 is a vertical cross-section of the shaper-block and shaper through the line *r r* of Fig. 46.

The numeral 1 designates a frame or board which forms the supporting part of the machine and may be attached to a work-bench or to a wall or other support in any convenient manner. To the upper edge of this frame 1 is secured a forward-projecting casting, which forms an upper table 2, that supports a hopper and its feeding mechanism, all of which will be presently described. In this upper table 2 is formed a cigar-shaped opening 3, which communicates directly with a hopper 4, that is detachably secured to the top of said table around the upper edge of said opening. As shown, the hopper 4 consists of a front plate that is flanged at its lower end for attachment to the table 2, and at each end it is provided with vertical guideways 5 to receive the flanged ends of a removable back piece 4ª, which can be withdrawn vertically and replaced by a back piece of different form and length, according to the length of filler to be used and the bulk or quantity of material to be fed in forming bunches for cigars of varying shape and size. Two of these removable back pieces are shown in Figs. 13 and 14. The front of the hopper 4 is provided with a series of vertical slots 6 to receive a series of feeding pins or teeth 7 projecting rearward from a vertically-sliding plate 8, that moves in vertical guides or guide-posts 9, supported on an oscillating bar or arm 10, that is pivoted at 11 to the upper face of the table 2. Beyond its pivotal point the arm 10 is provided with an eye or loop 12, that loosely engages a stud 13 on an oscillatory arm 14, which is provided with an eye 15, that loosely engages a stud 16 on the main operating-lever or swinging bracket-arm 17, which is pivoted at 18 and 19, Fig. 6, to the frame 1, by which the machine is supported. The oscillatory arm 14 is pivoted at 20 to a lug or projection on one end of the upper table 2, and this arm 14 is formed at its inner end with a cut-off or valve 21, that is adapted to close the under side of the opening 3, which is formed in said table. The inner end of the pivoted arm 14 is provided also with a compressing device or chamber 22, which consists of a fixed jaw 23, that is rigid with the front edge of the cut-off or valve 21, below which it extends, and a movable jaw 24, which is fulcrumed at the pivotal point of the arm 14. The compressing-chamber 22 conforms in shape to the opening 3 and the hopper 4, and its size may be varied to correspond with the size and shape of the hopper at all times by replacing the movable jaw 24 with one of different set. The end of the fixed jaw 23 is formed with a slot or opening to permit the passage of a tongue or catch 25 on the end of the movable jaw 24, which catch is adapted to engage a pivoted hook 26, that is provided with a spring 27 to hold it in engagement with said catch on the movable jaw. When the arm 14 is actuated in the proper direction to move the valve 21 from beneath the opening 3, the catch 25 on the movable jaw 24 will engage the pivoted hook 26, and the compressing-chamber 22 will receive tobacco from the hopper. On the return-movement of the arm 14, actuated as hereinafter explained, the tobacco-filler will be compressed between the jaws 23 and 24, and the jaw 24 will remain engaged with the hook 26 long enough to permit said jaws to be locked by a hooked catch 28 on the fixed jaw, said catch being actuated by a spring 29 beneath one end. The jaws 23 and 24 being now locked together and holding the compressed tobacco the combined movements of the valve 21 cut off the access of any more tobacco from the hopper, and a cam 30 on the end of the fixed jaw 23 pushes back the hook 26 and permits the compressing-chamber 22 to be moved in line with a receiving-chamber 31, formed on a plate 32, that is secured to the under side of the table. The receiving-chamber 31 projects downward sufficiently to afford attachment for a flexible tube 33, (shown by dotted lines in Figs. 8 and 9,) through which the tobacco is delivered to the bunch-forming mechanism.

In the rear side of the receiving-chamber 31, above the upper edge of the flexible tube 33, is a slot 34, to permit the passage of a pivoted cut-off or valve 35, which is connected by a link 35ª with a curved lever 36, pressed by a spring 37, to hold the valve or cut-off in position within said chamber. The lever 36 is actuated to move the valve 35 backward out of the chamber 31 by means of a vertical projection 38, carried by the swinging bracket-arm 17. When the valve 35 is moved backward, a cam 39 on the pivotal end of the curved lever 36 is brought in contact with the pivoted end of the catch 28, and by bearing thereon releases the hooked end of said catch from its engagement with the movable jaw 24 of the compressing-chamber 22, and enables said jaw to fly open under the tension of a spring 40, located between the pivotal portions of the jaws 23 and 24, as shown in Fig. 2. The compressed tobacco in the compressing-chamber 22 is thus released, and falls through the chamber 31 and tube 33 to the bunching mechanism.

The frame 1 supports a forward-projecting shelf or bracket 41, to which, at 42, is pivoted an adjustable bunch-rolling board or lower table 43, which is segmental in form, as shown in Figs. 1, 2, 3, and 45. In the top of this table or bunch-rolling board 43 is a diagonal recess 44, in which bags a pocket 45, formed in an apron 46, as hereinafter explained.

Projecting from the frame 1 or vertical portion of the bracket 41 are arms 47, in which is journaled a rod 48, on which are sleeved a pair of vertically-swinging pocket formers or gages 49, which correspond in size and curvature to the recess 44 in the rolling board or table 43, said recessed rolling-board and pocket formers or gages being interchangeable with others to suit the size and form of the cigar to be made. One of the pocket formers or gages 49 is adjustable longitudinally on the rod 48, to vary the length of the bunch, and is held in place on said rod by means of a set-screw 50. These pocket formers or gages are connected by a loosely-attached clamping-bar 51, which rests above the bunch-wrapper when the machine is in operation. One of the rod 48 projects beyond its supporting-arm 47 and carries fingers 52 and 53, through which said rod is given a semi-rotary movement, as hereinafter described, to raise and lower the pocket formers or gages, and on this projecting portion of the rod 48 is a spring 54, which exerts sufficient friction against the adjacent supporting-arm to hold the rod and attached formers in the position to which they may be turned.

A yoke 55 is pivoted by means of a set-screw 56 to a lug 57 on the frame 1, so that it can be adjusted and secured at any necessary angle to correspond with the adjustment given to the bunch-rolling board. To the ends of this yoke are pivoted arms 58, which extend forward and downward on each side of the pocket-formers 49 and in advance of the same in position to rest on the bunch-rolling board, as shown in Fig. 3. The outer or forward ends of these pivoted arms are connected by a clamping or friction bar 59, which crosses the bunching-apron 46, and on the inner or rear ends of said arms 58 are weights 60, to partly balance said arms and prevent the clamping-bar 59 from exerting too much friction on the wrapper.

The swinging bracket or main actuating-lever 17 is provided with bifurcated uprights 61, which support yielding boxes 62, in which is journaled a bunching roller or bar 63, one end of which in its forward travel passes over a lift 64, which, as is shown in Fig. 1, is adjustably pivoted to the inner angle of the bunch-rolling board or table 43, to regulate the thickness of the cigar-butt, as described in my former above-named patent. One of the bifurcated uprights 61 supports the projection 38, through which the lever 36 is actuated. The other bifurcated upright 61 supports a friction-roller 65, which, during the forward movement of the bracket-arm 17, passes beneath and raises the pivoted elevating-lever 66, that is connected by a link 67 to one end of a feeding-lever 68, which is fulcrumed to one of the vertical guides 9 of the feeding mechanism. The other end of the lever 68 moves in a guide-loop 69 on the other vertical guide 9, and to this lever 68 is pivoted a link 70, which connects with the vertically-sliding plate 8, that carries the feeding-teeth 7, which project into the hopper, as before described. The upward movement of the lever 66 and link 67 oscillates the lever 68 in a downward direction and moves the teeth 7 downward in the hopper, thereby feeding tobacco into the compressing-chamber. When the teeth 7 have thus made a downward movement in the hopper, the lever 68 will automatically engage a hook-catch 71, that is pivoted to the adjacent guide 9, said catch being provided with a spring 72, that holds it to its engagement with the lever until the tobacco is confined in the compressing-chamber 22 and cut off from the hopper by the forward movement of the upper valve 21, that is formed on and actuated by the oscillating arm 14, which is operated by the main lever 17, as before explained. At this time in the backward movement of the main lever 17, whereby the valve 21 is moved forward, the stud 13, engaged with the arm 10, will move said arm 10 and attached guides 9 forward, thereby withdrawing the teeth 7 from the hopper 4 in a horizontal forward direction through the lower ends of the slots 6, thus bringing a projection 73 on the hook 71 in contact with a stop 74, that is adjustably supported in a lug 75 on the upper table. This contact of the projection 73 and stop 74 automatically releases the hooked catch 71 from its engagement with the end of the lever 68, and said lever is moved upward by the tension of a spring 76, thereby elevating the sliding plate 8 and its attached feed-teeth 7 in position to enter the upper ends of the slots 6, when the arm 10 is again moved backward toward the hopper. On the link 67 is a ball 67$^a$, with a set-screw 67$^b$ to keep it in place, and as this ball is moved up or down on said link 67 and fixed by the set-screw the end of the lever 68 will be raised more or less, as may be required, said lever being provided with an eye 68$^a$, that loosely engages the end of the link.

The manner of operating the machine is as follows: While the parts are in the position shown in Fig. 1, with the hopper filled with tobacco, either scrap or long filler, and the apron 46 arranged on the rolling-board or lower table 43, the swinging bracket-arm or main lever 17 may be moved forward either by means of a handle 17$^a$ or by any suitable power, as explained in my former patent. In moving the lever 17 forward the bunching-roller 63 bears on the depending finger 52, and thereby partly rotates the rod 48, so as to raise the pocket-formers 49 away from the apron, and the bunching-roller 63 at the same time passes beneath and raises the pivoted arms 58 and attached clamping-bar 59. The forward swinging movement of the lever 17 also causes the stud 16 to actuate the pivoted arm 14 and move the upper valve 21 backward from beneath the opening 3 in the upper table, and this brings the compressing-chamber 22 in line with opening 3 and the hopper 4 to receive a charge of tobacco. At the same time the arm 14, through its stud 13, actuates the pivoted arm 10 in a backward direction toward the hopper, thereby carrying the elevated sliding plate 8 and its attached feed-teeth 7 backward, causing the said teeth to pass through the upper ends of the slots 6 into the hopper. By the full forward movement of the lever 17 the roller 65 is caused to actuate the levers 66 and 68 to carry the teeth 7 downward in the hopper and feed the tobacco into the compressing-chamber. The lever 17 is now moved backward and, through the arm 14 and attached valve 21 and jaws 23 and 24, cuts off and compresses the tobacco. The arm 14, through the attached arm 10, then withdraws and releases the feed-teeth, as already described, and at the same time the compressing-chamber 22 is brought into line with the receiving chamber or opening 31, which at this time is closed by the lower valve 35, Fig. 1. As the lever 17 continues its backward movement it passes beneath the clamping-bar 59 and its supporting-arms 58 and comes in contact with the finger 53 on the rod 48, thereby raising said finger to the position shown in Fig. 8, and bringing the pocket-formers 49 down onto the apron 46, so as to force the slack of the apron into the diagonal recess 45 to form a pocket for receiving the tobacco to be bunched; but before the pocket-formers descend the clamping-bar 59 will return onto the apron by gravity and a wrapper will be laid over or across said clamping-bar in position to have the rear edge of said wrapper beneath the formers when they are brought down, as just described. When the lever 17 reaches its full backward stroke, the projection 38 comes in contact with the lever 36 and forces it back against the spring 37, thereby carrying the lower valve 35 out of or from beneath the chamber or opening 31, at the same time releasing the compression on the tobacco in the chamber 22, as already explained, so as to allow the tobacco to fall through the flexible tube 33 into the pocket prepared to receive it. The lever 17 is now again swung forward, thereby causing the bunching bar or roller 63 to move forward and take up the slack of the apron, at the same time collecting and rolling the tobacco contained in the pocket so as to form it into a bunch of the proper shape, in the manner described in my former patent. While the tobacco is thus being rolled and bunched in the pocket 45, the clamping-bar 51, carried by the formers or gages 49, will hold the tobacco in place and exert a downward pressure on the binder that greatly assists the forming of the bunch, until, finally, the continued forward movement of the bunching-roller will lift the formers 49 and bar 51 entirely out of the recess 44 and roll the pocket and contained bunch forward on the table 43 and beneath the clamping-bar 59 to the forward edge of the table, where the bunch is delivered to a receiver 77, of the construction described in my former patent.

If desired, a butt or tuck shaper 78, composed of soft rubber or other suitable material, may be placed beneath the apron, as shown in Fig. 3. This butt or tuck shaper will be formed to correspond with the desired shape, size, or thickness of the butts, and is therefore interchangeable, as required. In Figs. 4 and 5 are shown enlarged vertical sections of such shapers. The forward end of the shaper 78 is thinned down where it curves over the front edge of the rolling-board, and is attached by small flat-head tacks or otherwise to a movable dovetailed block 78ª, that is let into the table. The other end of the shaper is thinned down to a less degree and passes over the end of the movable dovetailed block under the bars 51 and 59, and the shaper is thus held in place beneath the apron 46, which is secured to the table as usual. Besides assisting in the proper formation of the butt the shaper also acts to prevent the spreading of the tobacco at that end of the bunch.

A shelf, bracket, or table 79 may be attached to the frame 1 to support stock and cigar molds in convenient proximity to the bunching mechanism.

What I claim is—

1. In a cigar-making machine, the combination, with a table having opening and tobacco-compressing and bunch-forming devices, of a feed-hopper over the table-opening, comprising a front plate having at each end a vertical guideway, and the interchangeable slidable backs having flanged ends detachably engaging said guideways, whereby the capacity and form of the hopper can be made to correspond to the size and form of the bunch to be made, substantially as described.

2. In a cigar-making machine, the combination, with a hopper having a series of vertical slots, of a pivoted horizontally-swinging arm provided with vertical guide-posts, a vertically-sliding plate movable in said guide-posts and provided with horizontally-projecting feed-teeth adapted to pass through and move vertically in the slots of the hopper, a lever for supporting and actuating said plate and attached feed-teeth, and mechanism for operating said lever and for actuating the horizontally-swinging arm that supports the plate-guides, substantially as described.

3. In a cigar-making machine, the combination, with the table having openings 3, a hopper on the table above the opening, and a pivoted horizontally-swinging operating lever 17, of the horizontally-oscillating arm 14, pivoted between its ends, loosely connected at one end with the operating-lever and at its other end provided with the cut-off valve 21, and a compression-chamber 22, composed of a rigid jaw 23, fixed to the cut-off valve, and a pivoted movable jaw 24, a catch for detachably connecting the two jaws, a cam 30, and means for opening the jaws and releasing their contents, substantially as described.

4. In a cigar-making machine, the combination, with the hopper 4, and the table 2, having an opening 3 communicating with the lower end of said hopper, of the horizontally oscillatory arm 14, formed with a valve 21, fixed jaw 23, and cam 30, and provided with a movable jaw 24, having a catch 25, said fixed and movable jaws forming a compressing-chamber, the pivoted hook 26, to engage catch 25, the spring 27, a hooked catch 28, to lock the jaws of the compressing-chamber in a closed position, a cut-off or valve 35, operating beneath the compressing-chamber, a lever 36, for actuating said valve, a cam 39, located on said lever to release the catch 28 when said valve is moved from beneath the compressing-chamber, and a spring 40, to open the jaws of the compressing-chamber and release its contents, substantially as described.

5. In a cigar-making machine, the combination of the table 2, having a cigar-shaped opening 3, the hopper 4, located above and around said opening, the plate 32, secured beneath said table and provided with a cigar-shaped opening or chamber 31, located out of line with the opening 3 and hopper 4, the horizontally oscillatory arm 14, provided with a valve or cut-off 21, and automatic compressing-chamber 22, operating beneath the opening 3, means, substantially as described, for automatically closing, locking, and opening said compressing-chamber, a valve or cut-off 35, operating beneath the opening 31, a lever 36, for actuating said valve, and a main operating-lever, as 17, from which the arm 14 and lever 36 are actuated, substantially as described.

6. In a cigar-making machine, the combination, with the table or bunch-rolling board 43, having recess 44, the apron 46, and the bunching roller or bar 63, of the vertically-swinging pocket formers or gages 49, having a curvature corresponding to the table-recess and connected by a clamping-bar 51, substantially as described.

7. In a cigar-making machine, the combination, with the frame 1, bunch-rolling board 43, having recess 44, the apron 46, and the bunching roller or bar 63, of the arms 47, semi-rotary rod 48, having fingers 52 and 53 and spring 54, the vertically-swinging pocket formers or gages 49, mounted on the rod 48, one of said formers or gages being adjustable longitudinally on said rod, and the clamping-bar 51, connecting said formers, substantially as described.

8. In a cigar-making machine, the combination, with the recessed bunch-rolling board 43, apron 46, vertically-swinging pocket formers or gages 49, clamping-bar 51, attached to said formers, and the bunching roller or bar 63, of the yoke 55, having pivoted arms 58, connected at their forward ends by a friction-bar 59, and provided with weights 60 on their rear ends, substantially as described.

9. In a cigar-making machine, the combination of the swinging bracket arm or lever 17, carrying a roller 65, the pivoted lever 66, acted on by said roller, the link 67, lever 68, the vertically-sliding plate 8, suspended from said lever 68 and provided with feed-teeth 7, the slotted hopper 4, the spring 76, and means for automatically locking and releasing the lever 68, substantially as described.

10. In a cigar-making machine, the combination of the apertured table, the horizontally-adjustable recessed bunch-rolling board 43, an apron 46, secured under the table, the swinging operating-lever 17, having uprights 61, the bunching-roller 63, carried by said uprights, the movable block 78$^a$, set in the table, and the elastic butt-shaper 78, detachably secured under the apron to said movable block and having a thin portion to extend over the edge of the bunch-rolling board, substantially as described.

In testimony whereof I have affixed my signature in presence of two witnesses.

A. H. SHOCK.

Witnesses:
GEO. W. REA,
J. A. RUTHERFORD.